(12) United States Patent
O'Boyle

(10) Patent No.: US 6,328,209 B1
(45) Date of Patent: Dec. 11, 2001

(54) CARD SECURITY SYSTEM

(75) Inventor: Lily O'Boyle, Elmsford, NY (US)

(73) Assignee: American Bank Note Holographics, Inc., Elmsford, NY (US)

( * ) Notice: Subject to any disclaimer, the term of this patent is extended or adjusted under 35 U.S.C. 154(b) by 0 days.

(21) Appl. No.: 09/243,133

(22) Filed: Feb. 3, 1999

(51) Int. Cl.⁷ .................................................. G06K 5/00
(52) U.S. Cl. ........................................ 235/380; 235/382
(58) Field of Search .................................. 235/380, 382, 235/381, 382.5

(56) References Cited

U.S. PATENT DOCUMENTS

| | | |
|---|---|---|
| 4,788,420 | 11/1988 | Chang et al. . |
| 4,825,054 * | 4/1989 | Rust et al. ............................ 235/380 |
| 4,827,425 * | 5/1989 | Linden ............................ 235/380 X |
| 4,855,584 | 8/1989 | Tomiyama et al. . |
| 5,814,796 * | 9/1998 | Benson et al. ........................ 235/375 |

FOREIGN PATENT DOCUMENTS

WO 92/17856 * 10/1992 (WO) .

* cited by examiner

*Primary Examiner*—Karl D. Frech
(74) *Attorney, Agent, or Firm*—Liniak, Berenato, Longacre & White

(57) ABSTRACT

The object of the present invention is to effectively enhance card security in a system using identification card or the like. The card security system comprises a card issuing apparatus 100 and a card reader 300. The card issuing apparatus 100 obtains data D and E by reading hologram 2 and barcode 3 on a card 1. Data A, B and C are input from computer 200. An encryption unit 104 generates check data EN based on data A–E. A magnetic writer 103 write the data A–E and EN on a magnetic stripe 4. The card reader 300 reads data A–E and EN from the card 1, generates check data based on the read data A–E, and determines whether or not the card is genuine by comparing the calculated check data with the read check data EN.

14 Claims, 12 Drawing Sheets

CARD SECURITY SYSTEM

BACKGROUND OF THE INVENTION a) Field of the Invention

The present invention relates to a card security system using an identification card such as a credit card, an ID card or a driver's license. Further, the present invention relates to a method of enhancing security, a card reading apparatus, a card issuing apparatus and a hologram reader appropriate for such card security system.

b) Description of Related Art

In the early days of credit cards, banks provided cards indiscriminately, and control of blank cards was lax. Consequently, there was an ample supply of blank credit cards with the banks' names on them which could be used by criminals. Additionally, the lack of security printing of these cards made it easy for criminals to manufacture their own counterfeit cards whenever a supply of genuine cards was not available, and this "business" enriched many.

As the losses to the banks escalated, the banks more and more took measures to tighten the issuance of cards to approved customers, and also to increase the security of the design and manufacturing of the card itself. A number of measures were considered, but it was the introduction of a piece of foil bearing a holographically generated diffraction grating on the front of the card that virtually eliminated what was then the major source of cards for criminals—the counterfeited card. Unfortunately criminals are still left with at least three other major opportunities for fraud.

The first is the use of a stolen or lost card—which can be used until the holder reports it lost or stolen. The second was the use of a "good" account number re-encoded onto an otherwise outdated or lost, but previously valid card. The third is using a valid number (without the card) or a "white" card with magnetic stripe for use in automatic teller machines (ATM) or telephones where the card is not authenticated by a person, but only machine read. Actually, there is a fourth type of fraud about to reassert itself. The Master Card and Visa holograms have been used in the field for eight years. Soon there will be sufficient technology available for someone, somewhere to begin creating acceptable counterfeits. It is again time for the security printer to remain the proverbial one step ahead of the counterfeiter.

Technology can do little at present with respect to fraud of the first type. However, the present invention can effectively enhance security against fraud of the second, third and fourth types.

In a typical credit card transaction a sales clerk looks at the card and, if it appears valid, swipes the card in a magnetic reader, such as that disclosed by Chang et al. (U.S. Pat. No. 4,788,420) and incorporated herein by reference. The reader sends the account access identification number back to the authenticating source. If the source responds with approval, a transaction takes place. Eventually the legitimate card holder receives a bill which he/she pays or disavows. If properly disavowed, eventually the bank will have to absorb the loss since the magnetic reader had provided an authentic account access identification number which was accordingly approved. This is what happens in fraud of the first and second types.

The account access identification number written or encoded into the magnetic stripe is very much like the license plate number of a car. There is not a great deal of information on the license plate, nor is there a great deal of information in the magnetic stripe. The really valuable information, the payment history, the maiden name of the customer's mother, etc. are all stored down stream in the bank's information system. Only the credit available is normally reached by inquiry from the field.

Thus the situation is similar to the automobile's license plate—or registration; not too much information is stored in the field, just a method of getting to the information stored in the Department of Motor Vehicle files.

Access to only a small part of the bank's information on a customer (current validity of the card, available credit) is made available to the merchant through the electronic network which is used every time a credit card is swiped or magnetically read by the equipment currently available to read and report a transaction.

While the supply of generally acceptable credit cards for illicit purposes is imperfect and small, it is still relatively easy for the determined criminal to acquire a physically genuine but outdated credit card and alter the magnetic information and also re-emboss the expiration date and names on the front. While the ironing out of the original name and re-embossing is not perfect and, upon close inspection can be determined by those familiar with such fraud, these mundane attempts to defraud are generally successful. Then, when the card is swiped, a credit worthy account is identified and the swipe machine is given a green signal to validate or authenticate the transaction.

In some cases, especially at an ATM the only thing the criminal needs is a blank card with a magnetic tape encoded with a valid magnetically readable account access identification number and the unsuspecting victim's personal identification number (PIN) number. There are also a number of places, telephone, kiosks and supermarkets where PIN numbers are not required and clerk verification of the actual card is not done.

There has been a long and valiant attempt to make the magnetic encoding secure and resistant to alteration. Watermark tape by Thorne-EMI was one such. The development of high oersted tapes by 3M Company and others is another. Both provide some limited enhancement of security in their own ways. But neither has found acceptance in the industry because of the changes to existing procedures each might require.

The Thorne-EMI approach magnetically incorporates a sequential number into the tape while the tape is in the manufacturing process; this can then be read by the magnetic reader. The idea and process was thwarted by the difficulty of manufacturing the tape and by keeping sequential numbering accounted for; and it was generally deemed to be too expensive.

The 3M solution is a solution only to the extent that high coercivity tape requires more powerful encoding equipment than that used to encode 300 oersted tape (the industry standard). To the extent such equipment is harder to obtain, security is at least marginly enhanced. The industry may yet move to high coercivity tape. It would require all Service Bureaus and Banks with their own issuing departments to buy new encoding equipment at least to phase it in over time. This is a heavy investment of equipment by a group with no great incentive to do so and there is no indication such high coercivity encoding equipment would not be available to the criminal element. As stated this is, at best, a marginal move.

In all cases, whatever has been placed within the magnetic reading environment is obtainable to anyone with rudimentary equipment to read the magnetic encoding. Even if the numbers make no sense—being in code or encrypted—it is still easy to replicate the coded or encrypted number. What has been lacking in the past, and which this invention solves, is another—unreadable by conventional equipment—level of numbers which can be incorporated into the magnetic stripe in a cost effective way.

All other efforts including the algorithms of magnetic numbering are vulnerable no matter how complex and sophisticated because it is the entire magnetic number, original or forged, which is read by the magnetic reader which relays that number down the communication line to the bank for verification.

An approach to solving the problem already exists with the "batch" number which is printed on most credit cards by the card manufacturer. Most often these are four digit numbers found on all American Express Cards and now upon some Master Cards. If there is some reason to suspect a transaction is fraudulent, then the validity of the card can sometimes be tied into the actual card by telephoning the issuing bank to determine if the batch number is a) genuine and not stolen and b) if the magnetic information pertaining to a particular person on the card was matched to the batch number on the front of the card.

This is an imperfect and laborious way of determining fraud and is only done when the person offering the card appears to be out of character for the transaction—i.e., a teenager in dirty sneakers attempting to use a card to purchase a brand new automobile, or some such off-putting situation.

A further approach is developed by Tominyama et al. in U.S. Pat. No. 4,855,584 of Aug. 8, 1989. They developed a "double" read of the card in question by machine, rather than the above mentioned need to telephone in the data. However, in their approach one needs to hide the "certifying medium" by using a bar code which actually acts like a magnetic stripe. Not only is this improbable in practice but even if one discounted the need to have a "magnetic reader" read the barcode (printed as it is in magnetic ink, column 4, lines 30–39) and printed a barcode viewable only by an IR reader, the determined counterfeiter could decipher the underlying information, since it also is a magnetic reading medium.

All the criminal needs to do is copy the entire number. The problem is similar to attempting to create a visual security pattern or system which cannot be copied by a color Xerox machine. As long as the human eye can see the security pattern so can the color copier. All sorts of attempts have been made to defeat the copier and at this writing all (short of the extremely cumbersome and impractical) have failed. The problem facing the authentication of the credit card is not quite so extreme and it does admit to a novel and very practical solution.

SUMMARY OF THE INVENTION

The present invention is provided in view of the foregoing problems. Various configuration are hereafter described, such as: card security system for enhancing security for cards and security enhancing method for card security system, card reading apparatus for card system and hologram reader adaptable for card reading system.

In order to achieve the above object, according to a method of enhancing security in a card security system of the present invention has the following steps:

a first recording step of recording at least first data onto an optically readable portion of a card;

an input step of inputting at least second data into the card issuing apparatus;

an obtaining step of obtaining check data based on the at least first and second data;

a second recording step of recording at least the check data into a storage medium which can be accessed by at least a card reader, and a checking step of checking genuineness of the card by the card reader, based on at least data obtained by reading the optically readable portion of the card, data obtained from said storage medium, and the second data used in said input step.

In order to achieve the above object, according to another aspect of the present invention of a card security system of the present invention comprising:

reading means for reading an optically readable portion of a card to obtain first data;

input means for inputting second data into the card issuing apparatus;

obtaining means for obtaining check data based on at least the first and second data in the card issuing apparatus;

recording means for recording at least the check data onto a storage medium which can be accessed by at least the card reader, and checking means for checking genuineness of the card by the card reader, based on at least data obtained by reading the optically readable portion of the card, data obtained from said storage medium, and the second data used in said input means.

In order to achieve the above object, according to a card reading apparatus for reading a card having optically readable portion, comprising:

optical reader means for reading at least first data from the optically readable portion;

first obtaining means for obtaining at least second data and third data from a storage medium;

second obtaining means for obtaining check data based on at least the first and second data; and judging means for judging genuineness of the card by comparing the check data with the third data.

In order to achieve the above object, according to a card issuing apparatus for issuing a card comprising:

reading means for reading at least first data from an optically readable portion of the card;

input means for inputting at least second data;

determining means for determining check data based on at least the first and the second data; and recording means for recording at least the check data to storage medium.

In order to achieve the above object, according to a hologram reader apparatus comprising:

irradiation means for irradiating light beam from a predetermined direction to a hologram image;

detecting means for detecting light intensity distribution of an reconstructed image formed in a space by the reflection light of the light beam irradiated by said irradiation means; and output means for outputting the data of the light intensity distribution detected by said detecting means.

In order to achieve the above object, according to a hologram reader apparatus comprising:

irradiation means for irradiating light beam from a predetermined direction to a hologram image;

interfering means for interfering the reflection light of the light beam irradiated by said irradiation means with a predetermined light wave to forming an pattern image;

detecting means for detecting light intensity distribution of the pattern image; and output means for outputting the data of the light intensity distribution detected by said detecting means.

The card referred to herein includes all type of cards such as credit cards and ID cards, but not limited. Further, the cards herein referred to includes such cards as bank notes which security protection is required.

BRIEF DESCRIPTION OF THE DRAWING

FIG. 9 is a drawing illustrating a pattern a barcode like;

DETAILED DESCRIPTION OF THE PREFERRED EMBODIMENTS

The preferred embodiments of the present invention will be described hereinafter with reference to the accompanying drawings.

Figure 1:
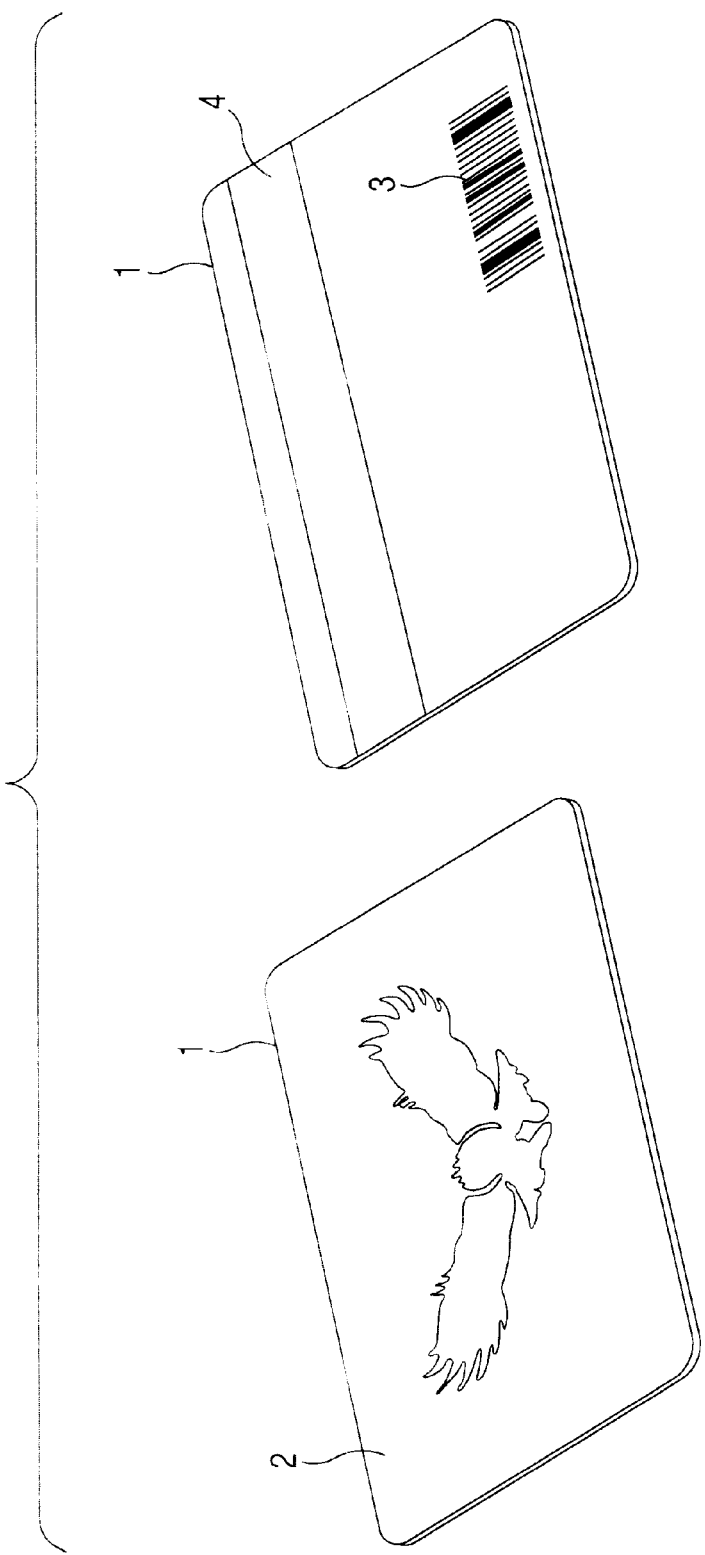
FIG. 1 is an oblique view for illustrating a card applicable for a card security system according to one embodiment of the present invention.

In FIG. 1 which illustrates a card applicable for a card security system according to one embodiment of the present invention, reference 1 indicates an identification card and front surface of the card substrate there is recorded a hologram image 2. Hologram cards acting as a first optical recording area are recorded on the entire or partial area of the hologram image area 2. On the other hand, barcodes 3, acting as a optical recording part, are printed on the rear surface of the identification card 1. The illustrated barcode is a type of one dimensional barcode, however they may be a two dimensional barcodes. A magnetic stripe is also provided on the rear surface of the card substrate.

Figure 2:
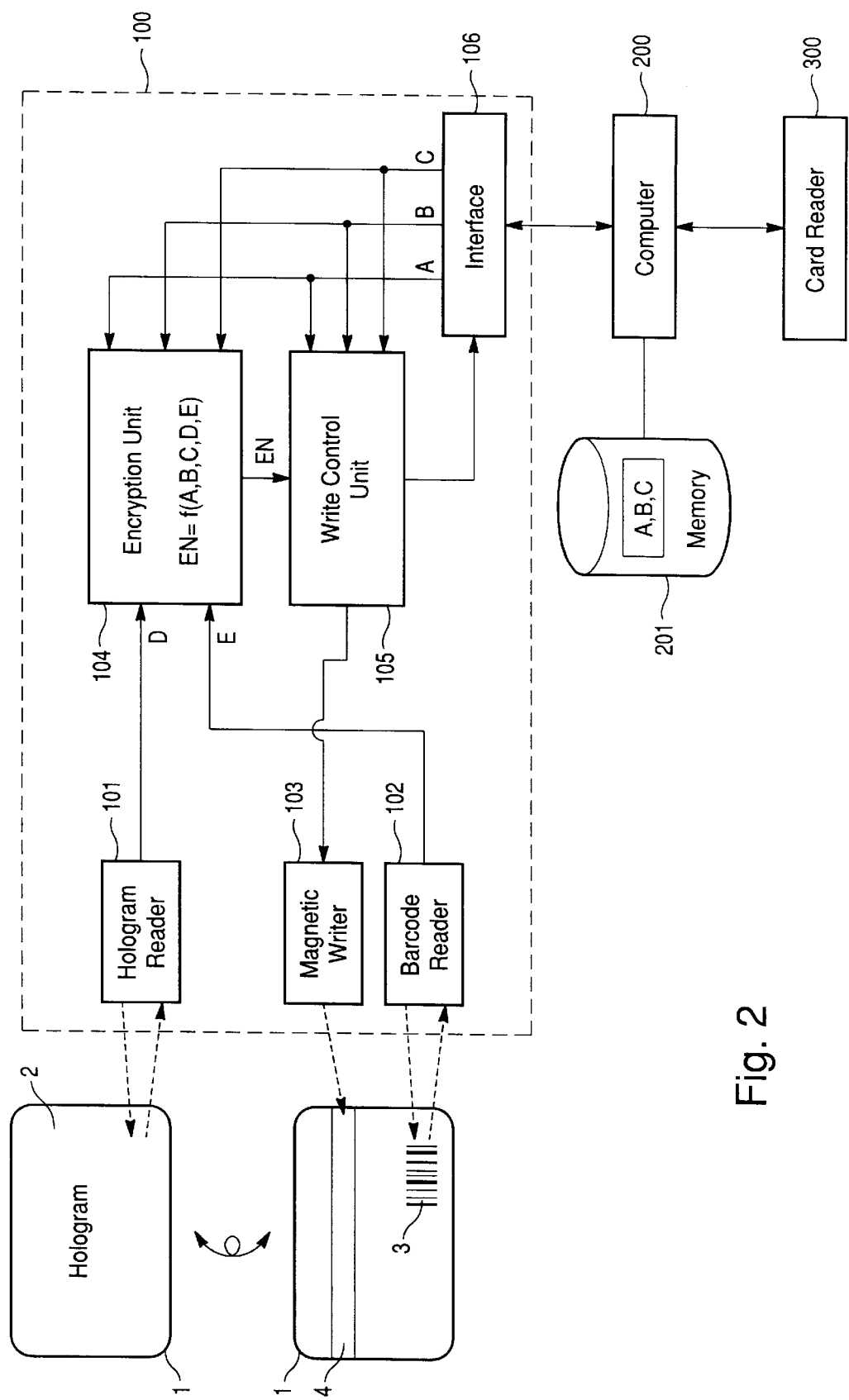
FIG. 2 is a block diagram illustrating arrangement of a card issuing apparatus according to one embodiment of the present invention.

FIG. 2 illustrates an arrangement of a card issuing apparatus according to one embodiment of the present invention. As mentioned above, the identification card 1 has the hologram image 2 on the front surface thereof and the magnetic stripe 4 and barcodes 3 on the rear surface thereof. The embodiment illustrated in FIG. 1 has image recorded on the entire surface of the front surface of the card, however a hologram image may be recorded in part of the front surface of the card. Further more, the hologram code may be recorded as a part of the hologram image or entire surface of the card thereof. The hologram cord may be recorded by a method of three dimensional method, and may be read out with a hologram reader discussed hereinafter.

A card issuing apparatus 100 has following arrangement, where 101 indicates a hologram reader which reads out data recorded in the hologram image from a reproduced image (three dimensional barcode image)by the light reflection from the hologram image 2. Reference numeral 102 indicates a barcode reader of well known type which reads out images from a single dimension barcode. The read out analog image signal is converted into digital data by an (not shown) A/D converter and outputted as data D. Data by barcode reader 103 is also converted into a digital form and outputted as data E. 103 indicates a magnetic writer which writes data on the magnetic stripe 4.

104 indicates an encryption unit which generates check data by arithmetic operation using the data D representing hologram image 2 read by the hologram reader 101, the data E representing barcode 3 read by barcode reader 102 and data A, B, and C providing by a computer 200, located externally, but being connected through interface 106. Here, the check data is defined as EN=f(A, B, C, D, E). 105 indicates a write control unit where the check data generated by the encryption unit 104 is written on the magnetic stripe 4 by the magnetic writer 103. The input data A, B and C input through the interface 106 are also written on the magnetic stripe 4 by the magnetic writer 103.

The interface 106 performs communication between the outside computer 200 and the card issuing apparatus 100. Since the computer 200 is connected to the card issuing apparatus 100, as well as to a card reader 300, memory 201 is accessible by the side of the card issuing apparatus 100, and the card reader 300. Detailed arrangement of the card reader will be discussed hereinafter.

Data A, B and C are stored in the memory 201 and read out to the card issuing apparatus 100, when the card issuing apparatus issued such requests.

For example, data D may be a money value data of the specific card, data E may be an inherent identification number assigned to the card. On the other hand, data A, B, and C which are inputs into the card issuing apparatus 100 through the interface 106 may be date, shop identifying number or data representing pass words. In the following explanation, it is assumed that these data are written on the identification card 1.

According to the another embodiment, these data A, B and C may be stored in the memory 201 instead of being written on the magnetic stripe 4, such arrangement will be discussed later in the modification of the embodiment.

Figure 3:
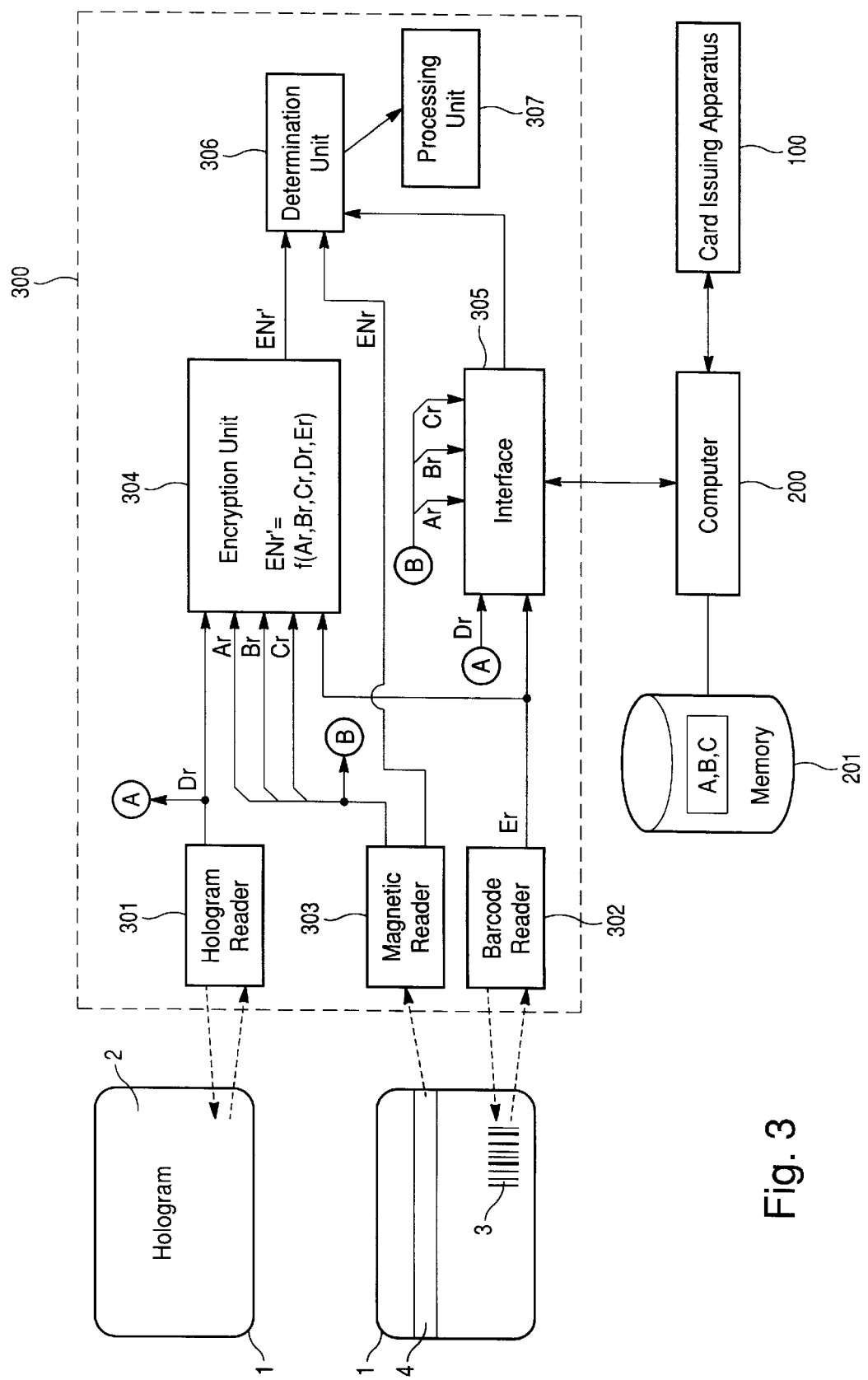
FIG. 3 is a block diagram of a card reader according to one embodiment of the present invention.

FIG. 3 is a block diagram of a card reader according to one embodiment of the present invention. A hologram reader 301 reads the hologram code recorded on the card to be processed and outputs the read data as data Dr to an encryption unit 304, the output data represents a value of the card. Barcode reader 302 reads barcode 3 and input the read out data to the encryption unit 304 as data Er representing identifying number of the card. Magnetic reader 303 reads date, shop number and password and forward them as data Ar, Br and Cr to the encryption unit 304. In addition to these reading, the magnetic reader reads check data out of the magnetic stripe 4 and forward it to a determination unit 306 as data EN.

304 is an encryption unit where check data ENr' is produced by referring to input data Ar, Br, Cr, Dr and Er. An algorithm employed in the encryption unit 304 (arithmetic operation for encryption), is the same as that of used in encryption unit 104 (FIG. 2). 305 indicates an interface which controls communication between the computer 200 and the card reader 300. The instant interface 305 transmits data Ar to Er, received from the hologram reader 301, the barcode reader 302 and the magnetic reader 303, to the computer 200. The computer 200 verifies the validity of the data Ar, Br and Cr by comparing the data Ar, Br and Cr received from the computer and the data A, B and C stored in the memory 201. The result of the verification is informed to the interface 305 from the computer 200 and the result is output to the determination portion 306.

As to an alternative arrangement, a table may be provided in the memory for registering data A, B and C for reading out these data. When the computer inputs identification number representing respective card, the identification number is used for determining a reading address of the table. By this arrangement, the authentication of validity of the card is done by accessing to the table with identification number (data Er) to read out the corresponding data A, B and C from the table. Authentication of the data may be established by comparing the read out data from the table with the data Ar, Br and Cr input by the card reader. For this arrangement, data A, B and C are assigned to cards respectively. Accordingly, for example, password may be assigned to each card uniquely.

The decision unit 306 compares the check data as an output of the magnetic reader 303 from the magnetic stripe 4 and the check data ENr' obtained at encryption unit 304. If these check data agree and the interface output 305 indicates verification of a genuineness of the card, the instant card is accepted by the apparatus. Then the decision unit 306 instructs a processing unit 307 to perform the process of the card according to the nature of the card. In this embodiment, cash is dispensed according to the stored value in the card. The value is recorded as in the form of a hologram image on one surface of the identification card 1.

Next, operation of card issuing apparatus and card reader 300 is discussed with referring to the flow chart.

Figure 4:
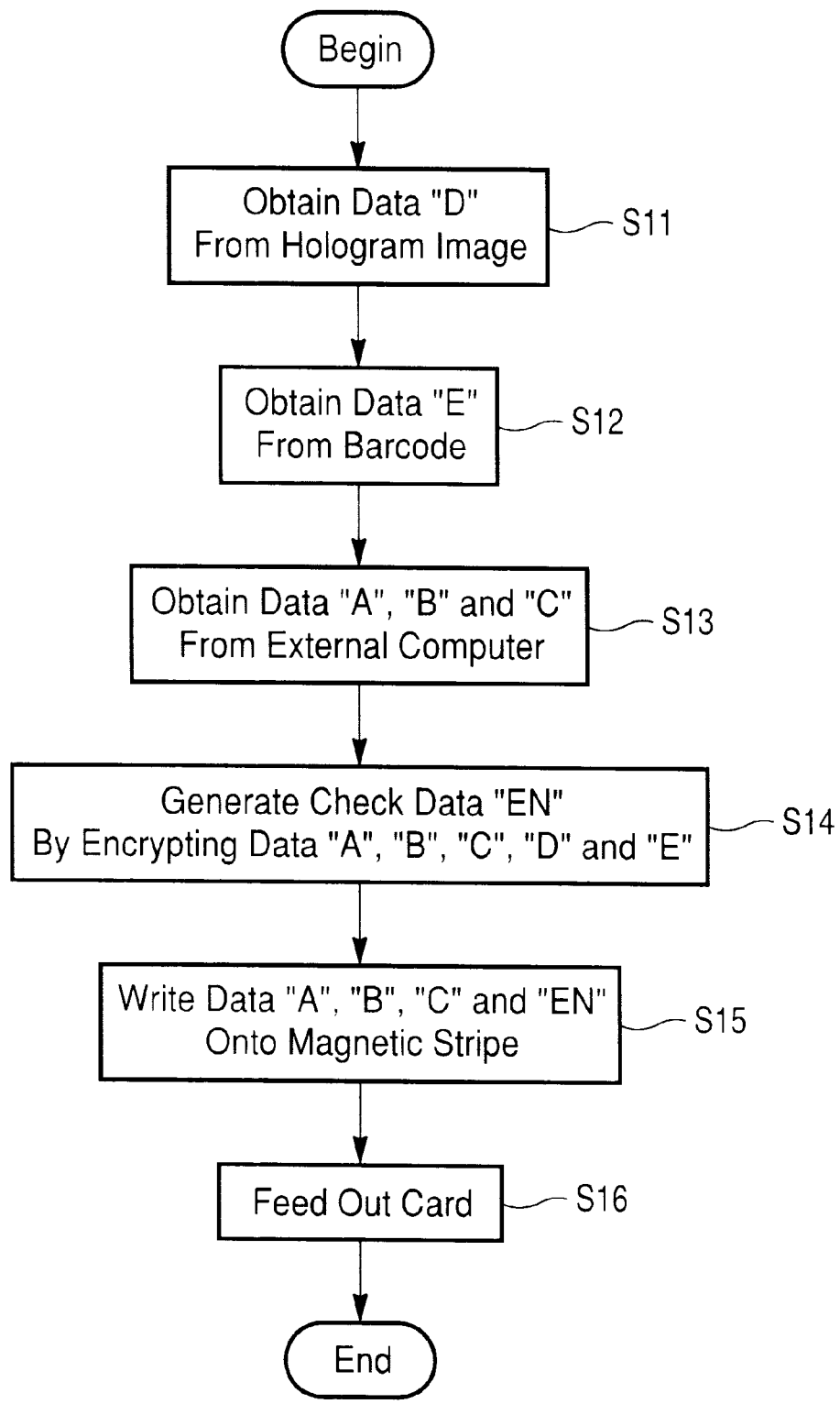
FIG. 4 is a flow chart for illustrating an operation of a card issuing apparatus 100.

As in shown in FIG. 4, according to the embodiment of the present invention, a card having hologram image including hologram code (money value data) and identification number recorded in the form of one dimension barcode form is fed to the card issuing apparatus 100. The card issuing machine performs magnetic encoding of a check data on the magnetic stripe on one side of the card under the control of the computer 200.

In step S11, the hologram reader 101 reads out hologram image of the card fed to the apparatus and obtains data D representing the money value. In step S12, the barcode reader reads out barcode on the identification card 102 and obtains data E(ID number). In step 13, the card issuing apparatus 300 receives data A, B and C(date, shop identification number and password) from the computer 200 through the interface 106.

Then control goes to step 14 where the encryption unit 104 performs encrypting operation on data A to E and generates a check data EN. In step 15, a magnetic writer writes data A, B and C which are obtained at step 13 as well as the check data obtained at step 14. After completion of these writing operation on the card, the card issuing process ends and the card is fed out of the machine(S16).

According to the above-mentioned embodiment, cards have pre-formed optical recording portion (hologram code and barcode), however, these optical recording portion need not be pre-recorded on the card, but they may be recorded by the card issuing apparatus concurrently with the issuance of the cards. In such an arrangement, data D and E must be generated by the card issuing apparatus(or receiving these data from the computer 200) instead of reading from the card. The hologram reader 101 and barcode reader 102 need not be equipped with the card issuing apparatus because Data D and E are generated within the card issuing apparatus.

Figure 5:
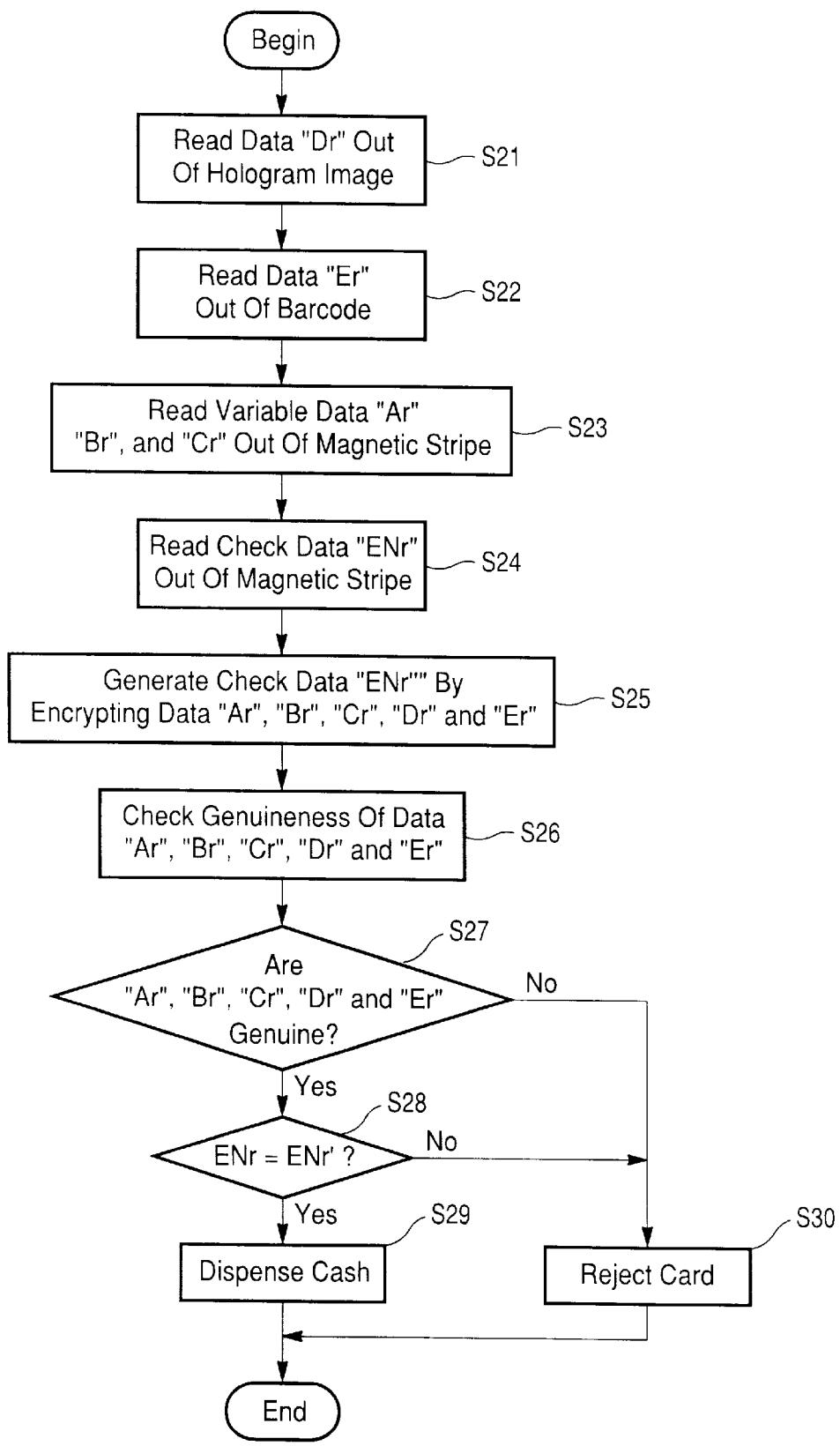
FIG. 5 is a flow chart for illustrating an operation of a card issuing apparatus 300.

FIG. 5 is a flow chart for discussing the sequence of operation taken by the card reader 300. The card reader 300 verifies cards issued by the above-mentioned process.

In step 21, the hologram reader 301 reads hologram image 2 recorded in the hologram image area The hologram image data is referred to as Dr (money data). In Step S22, the barcode recorded on the card 1 is read by the barcode reader 302 and the read out data is referred to as Er(ID number). In step S23, the magnetic reader 303 reads data Ar, Br and Cr (date, shop identification number and password) out of the magnetic stripe 4. Further control proceeds to step S24, where the magnetic reader 303 reads check data from the magnetic stripe 4. The check data is referred to as ENr. In step 25, the encrypting unit 304 performs encrypting arithmetic operation on data Ar, Br, Cr, Dr and Er, obtained through steps S21 to S23, thereby check data ENr' is generated.

In step 26, Data Ar to Er are sent to the computer to verify genuineness of the data. The result of verification by the computer 200 is informed to the card reading apparatus 300 through the interface 305. One example for how to verify the data is to check if the date has expired or is able or unable to locate appropriate shop identification number or password in the computer. If the card issuing apparatus is designed to store card identification number at originally issued, the genuineness of the card is also checked. In this embodiment, individualized data A, B and C are assigned to cards, the computer needs to store a table having data set corresponding to card identification number and related data A, B and C.

In step 27, evaluation unit 306 checks the result of verification test by the computer 200, if the card is judged as being a forgery, the dispensing of cash is rejected at step S30. If the computer discriminates that the card is forged, this fact also may be displayed. If the computer discriminates the card as being genuine, the Control goes to step S28 where a comparison is made between the check data ENr read by the magnetic reader 303 and the check data arithmetically generated by the encryption unit 304. In this comparison, if both data agrees, the card is discriminated as genuine, and the control is proceeded to step S29 where cash is dispensed according to the value of the money data stored in the hologram image 2. If there is no agreement in the comparison, the card is rejected by the card reader.

In the above discussion, data acquisitions are also discussed in conjunction with each processing step, however, data acquisitions are not necessary at each sequence of the processing steps.

In the above-mentioned arrangement, the card reader 300 and computer 200 is coupled via communication line so as to verify the data Ar, Br and Cr, however the computer 200 need not necessary be connected to the card reader 300. When this alternative arrangement is adopted, the interface may be taken out from the card reader and also steps 26 and 27 may be omitted.

In this modification, the genuineness of the card is discriminated simply by the check data obtained from the magnetic stripe and check data ENr' generated by the encryption unite 304, however written data on the magnetic stripe is varied by the data D recorded in the form of hologram code, enhancement of the security is not hampered.

In the above-mentioned card reader, additional function such as data deletion function or data invalidation facility may be provided.

With referring to FIGS. 6 and 7, further embodiment of the security enhancing system will be discussed hereinafter. The same reference is used to the same or similar parts throughout the specification.

According to this embodiment, the card issuing apparatus illustrated in FIG. 2 is modified to abbreviate writing data A, B and C on the magnetic stripe, by only write check data EN generated by the encryption unit 304 on the magnetic stripe. Along with this modification the control step S15 in flow chart FIG. 4 is also modified.

Figure 6:
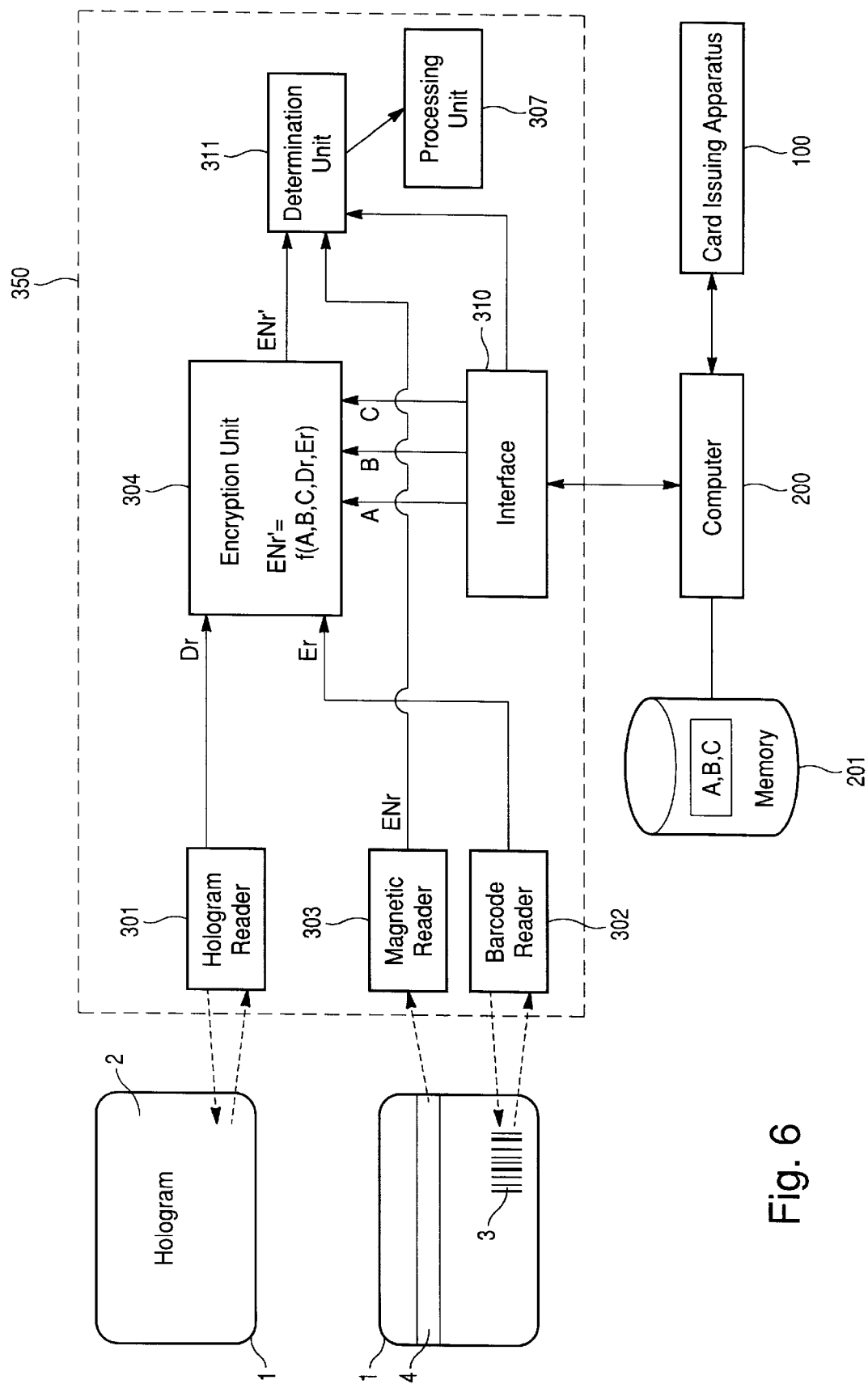
FIG. 6 is a block diagram for illustrating a first modification of the card security enhancing system of FIG. 1.

According to the arrangement illustrated in FIG. 6, an interface 310 receives data A, B and C from the computer 200 and put them out to the encryption unit 304 where a check data is generated based upon input data A, B, C, Dr and Er. A determination unit 311 receives encrypted data ENr' from the encryption unit 304 and check data ENr from the magnetic reader read out from the magnetic stripe 4 and compares these two data to determine if they agree or not. If there is agreement, the card is discriminated as valid.

Figure 7:
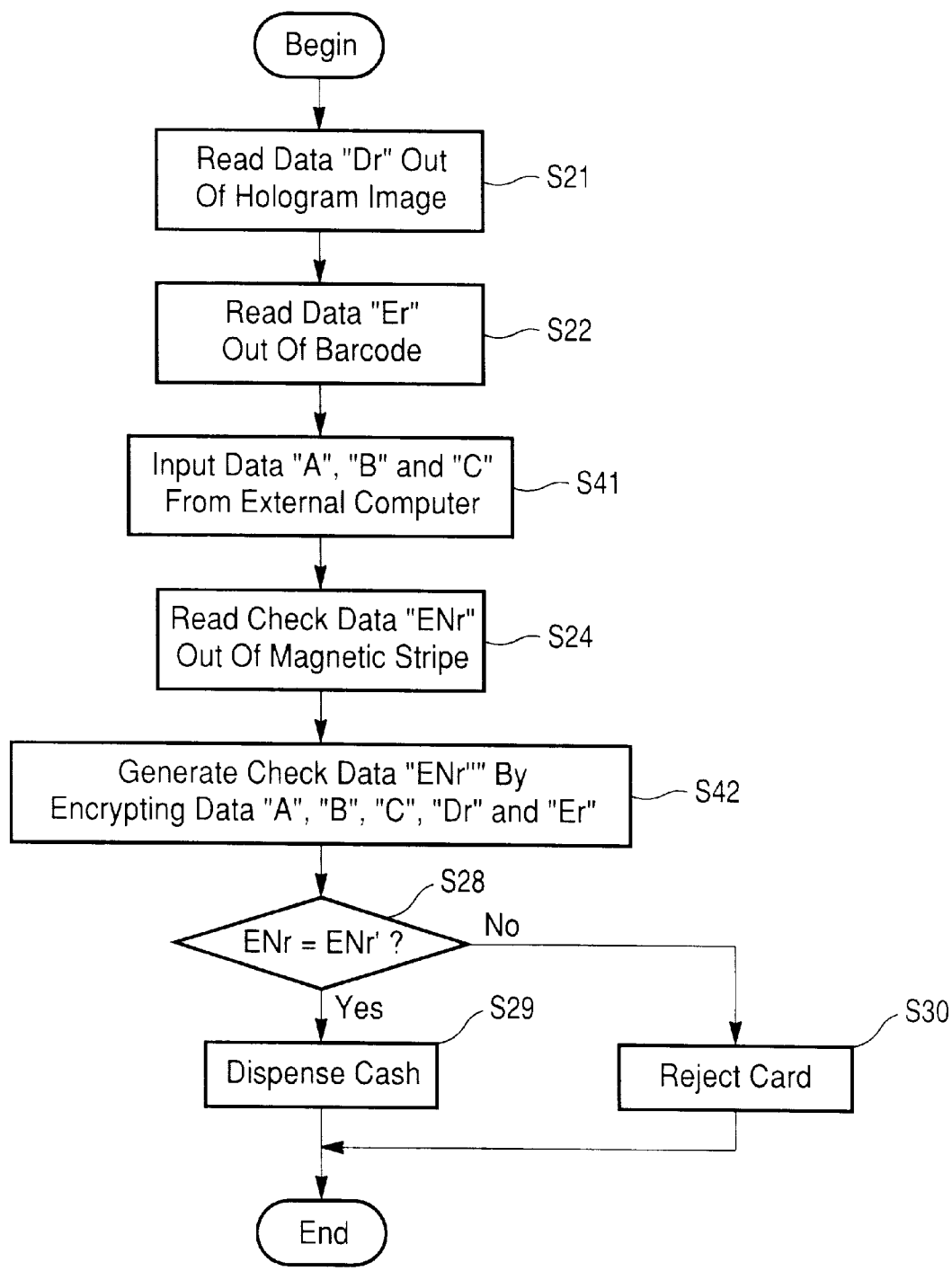
FIG. 7 is a control flow chart for illustrating control steps for the card reader of the illustrated in FIG. 6.

FIG. 7 shows control steps employed in the card reader 350 where the same control step is referenced by the same reference number. In step S41, data A, B and C are acquired from the outside computer 200 via interface 310. In step S42, check data ENr' is calculated by the encryption unit 304 based upon the acquired data A, B, C, Dr and Er. These check data ENr' and check data ENr are compared at step 24 to determine the validity of the card.

In the above-mentioned modification, the check data EN is recorded on the magnetic stripe 4 but data A, B and C are not recorded on it. There are many variations on where data A to C and check data are reserved. One of candidate for such reservation of the data is to write check data EN and data A on the magnetic stripe 4, or may store all of them in the memory 201.

The following discusses a second modification where check data is written in the memory 201 and the magnetic stripe 4 is not used to store such data.

Figure 8:
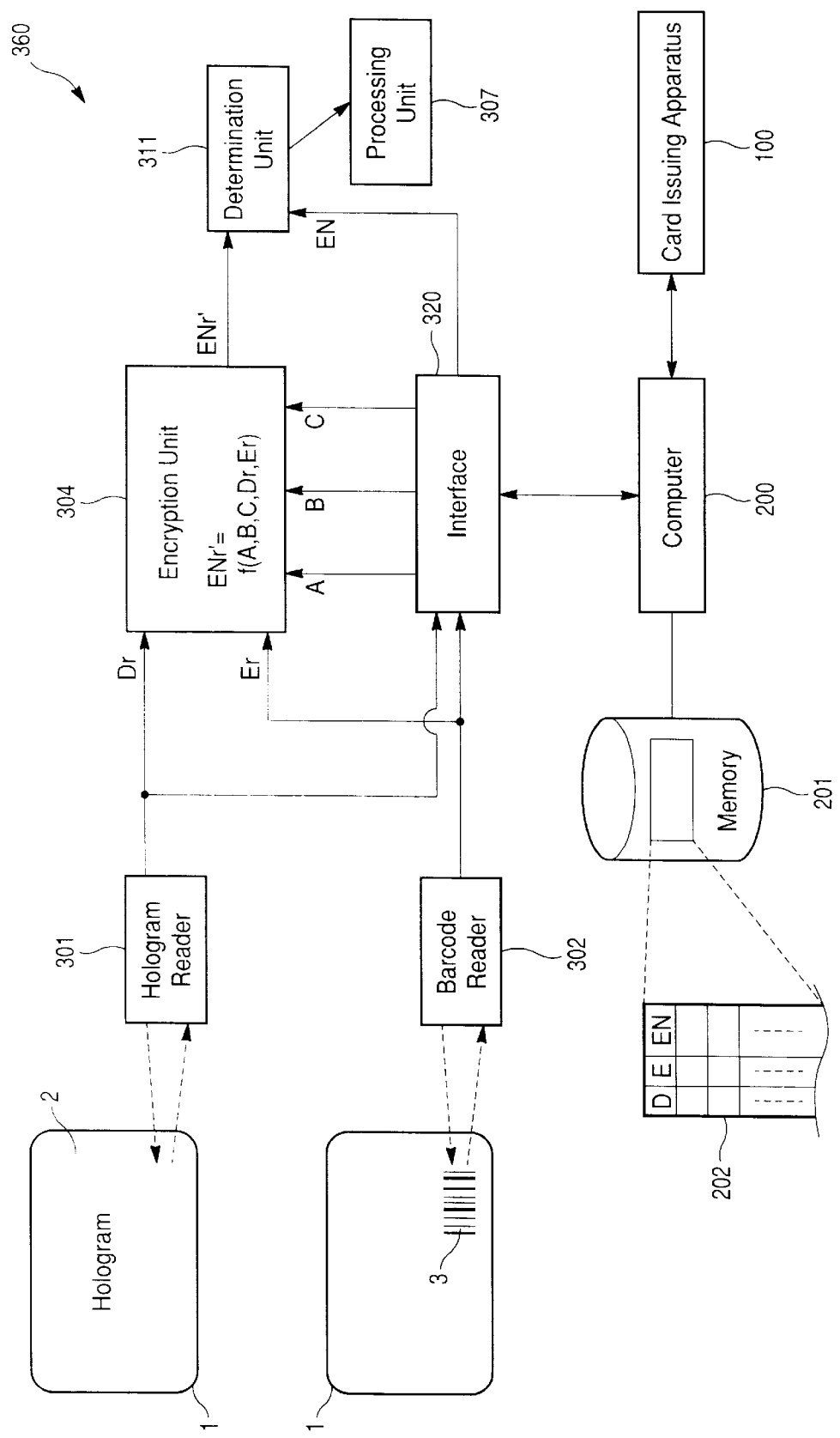
FIG. 8 is a block diagram illustrating a card reader according to a second modification of security enhancing a system of the present invention.

In the second modification illustrated in FIG. 8, the write control unit of the card issuing apparatus 100 does not write the check data EN on the magnetic stripe, but not only this, the other data A to C are not written. According to this arrangement, the magnetic stripe 4 may be omitted from the card. stead of writing on the magnetic stripe, write control unit 105 sends the check data EN, data D (money data) ,data E (ID number) to computer 200.

The computer generates a check data table 202 (refer to FIG. 8) having data structure in which data D and E are corresponding to check data EN and stores the generated table in memory 201. The data E is a unique proper number assigned to each identification card, the data E can serve as a key to identify the check data. By adopting this arrangement, the check data stored in the check data table may be accessed with data E.

FIG. 8 shows a system which uses an identification card having no magnetic stripe thereon. According this type of the card, the magnetic reader is also omitted from the card reader 360.

The encryption unit 304 performs encrypting operation for generating check data ENr' based upon data A, B and C received from the computer 200 via interface 320, data Dr received from the hologram reader 301 and data Er received from barcode reader 302. The generated check data ENr' is outputted to the determination unit 311.

Data Dr obtained by the hologram reader and data Er obtained by the barcode reader 302 are output to the computer 200. Upon receipt these items of data, the computer 200 retrieves the check data table 202 with data Dr and data Er, puts out retrieved data EN. The output check data EN is then outputted to determination unite 311 through interface 320.

Both the ENr' and EN are received by the determination unite 311, the unit 311 compares these data to see if they agree to determine the genuineness of the card. The control flow employed in the card reader 360 is substantially the same to that of illustrated in FIG. 7. However, step S24 must be changed to read "send Er and Dr to the computer and obtain the check data EN from the computer in response".

According to the above-explained card security system, since the check data is processed by referring to the data A to C given from external, further enhancement of the security of the card issuing apparatus may be achieved by alternating data A to C periodically or randomly. Furthermore, security of this system is improved because of data Dr is read out from the hologram 2.

Kinds of data and methods for recording data discussed in the foregoing embodiments are only for explanation and not limited to the said embodiments. For example, identification number for the identification card may be stored in the hologram area in the form of hologram image.

In the above embodiment, the check data and others are written on the magnetic stripe, however they may be recorded in the optically readable area such as hologram and barcode areas. Further arrangement such as providing IC memory on the identification cards so as to enable to store various data necessary for the present system may be used. The number of the optically readable portion and magnetically readable portion is not necessarily limited, they may be more than two on the card.

In the above-mentioned embodiments, the computer is located external to the apparatus as an independent component, however, the computer may be located inside of the card issuing apparatus or in the card reading apparatus. The computer 200 is not necessary to be independent, a central processing unit provided in the card issuing apparatus or card reader may be used as the computer 200.

We will discuss arrangements and operation of the hologram readers for reading hologram cards and hologram image in detail hereinafter.

Holograms are recorded on surfaces of the card using a holographic method or a direct pattern image method. A Fourier transform hologram or Fresnell type hologram may be applicable to the present invention.

Figure 9:
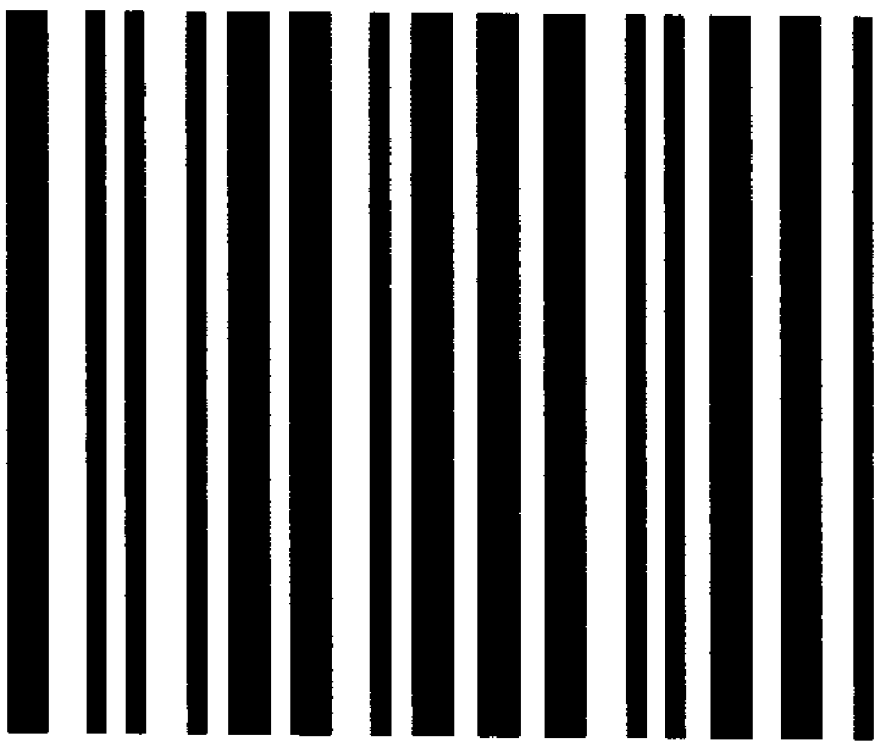

In the following discussion, Fourier Transform Hologram is utilized and a barcode image is used as an image pattern. It is noted that the image pattern for the hologram may be a random pattern, moire pattern, reverse Fourier transform pattern, or combination thereof. FIG. 9 shows an example of barcode pattern. Herein after, hologram image recording and reading is explained using an example where such barcode image is recorded as Fourier Transform pattern.

Figure 10A:
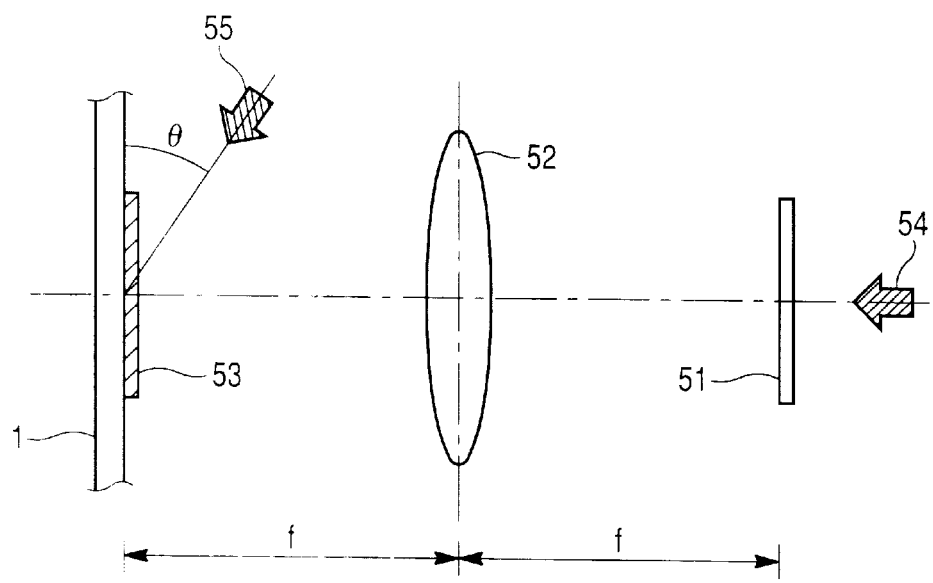
FIG. 10A is a drawing for explaining a hologram recording method utilizing fourier transform pattern.
Figure 10B:
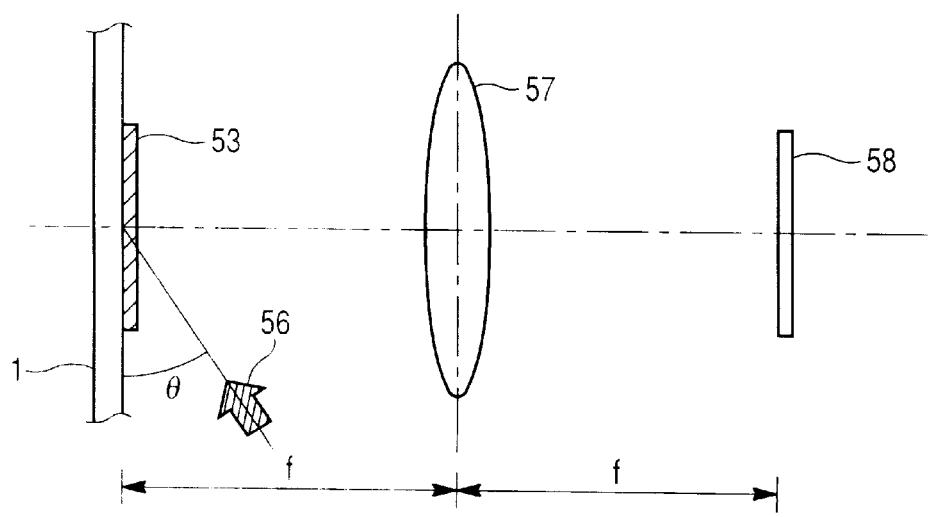
FIG. 10B is a drawing for explaining hologram reproducing method utilizing fourier transform pattern.

FIGS. 10A and 10B explain recording and reconstruction of Fourier Transform hologram image. FIG. 10A shows a typical hologram recording. A Fourier Transform Lens 52 is located at a distance f (f is front focal length of Fourier Transform Lens 52) away from a predetermined pattern 51 (in this embodiment, a barcode pattern as shown in FIG. 9). It is noted that a deflector may be mounted on the pattern 51 if necessary. A recording medium 53 is located at a distance of focal length f of the Fourier Transform lens 52 away from the lens 52. Pattern light from the light source 54 is irradiated as shown in FIG. 10A and reference light is irradiated with a predetermined angle θ. Pattern light through the Fourier Transform Lens 52 interferes with reference light 53, and Fourier Transform pattern corresponding to the pattern 51 is formed and recorded on the whole or a part of the recording medium 53.

FIG. 10B shows reconstruction of Fourier Transform hologram image. Collimated light 56 which is conjugate of the reference light 55 is irradiated with the same angle θ of the reference light 55 used in encoding process of the hologram. This results in a real image 58 being reconstructed at the front focal length through the Fourier Transform Lens 57. It is noted that although a Fourier Transform Lens is used for hologram recording in this embodiment, so called Lensless Fourier Transform manner may be used.

The above mentioned Fourier Transform recording method provides with high security since it is almost impossible to reconstruct the hologram image unless he/she does not know the optical specification, such as irradiation angle and wavelength of the reference light and characteristics of the Fourier transform lens, at recording of the hologram image.

Figure 11:
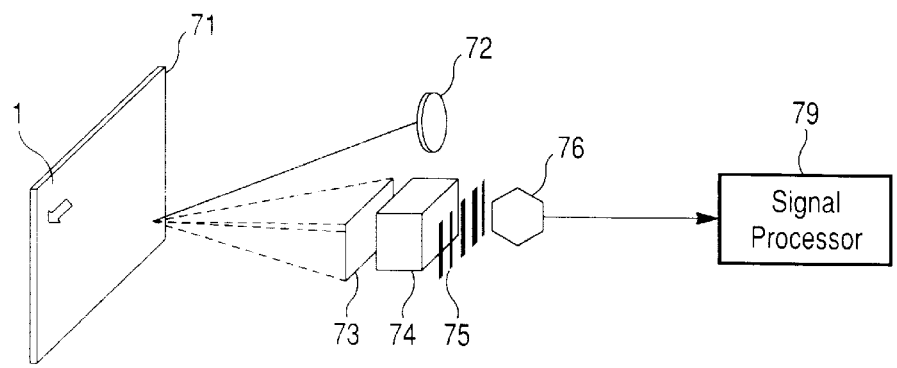
FIG. 11 is a drawing for illustrating detailed structure of the hologram reader of the card read according to the embodiment of the present invention.

FIG. 11 shows detailed structure of hologram reader adapted in the card reading apparatus of the present embodiment.

Reference numeral 71 denotes a hologram image formed on an identification card. Numeral 72 denotes a light source that is used to irradiate on the hologram image. Numeral 73 denotes a reconstructed image reconstructed by the light from the light source. Although, in the case of Fourier Transform Hologram, a Fourier Transform lens 57 (see FIG. 10B) is located at an appropriate place between the hologram image 71 and the reconstructed image 73, the lens is not shown in FIG. 11. It is noted that in the case of Fresnell hologram, such a transform lens is not necessary.

The reference numeral 74 denotes an optical processing unit which optically processes the reconstructed image 73 to form and output a predetermined pattern 75 (in this embodiment, the pattern 75 is referred as barcode pattern 75 since the pattern is a barcode). The reference numeral 76 denotes an optical sensor which scans the barcode pattern 75 and outputs signals corresponding to the intensity of the detected light.

The hologram reader of this embodiment reconstructs a barcode image shown in FIG. 9 from a hologram image. However, in this embodiment the hologram image is made by interfering a predetermined pattern on the barcode image. Accordingly, although a reconstructed image 73 is detected in a space through a Fourier Transform lens (not shown) by irradiating light from the light source 72 on the hologram image recorded in Fourier Transform Hologram, no meaning can be obtained from the reconstructed image 73 itself. However, the optical processing unit 74 processes reconstructed image 73 and barcode image 75 is reconstructed, thus providing meaning.

Figure 12:
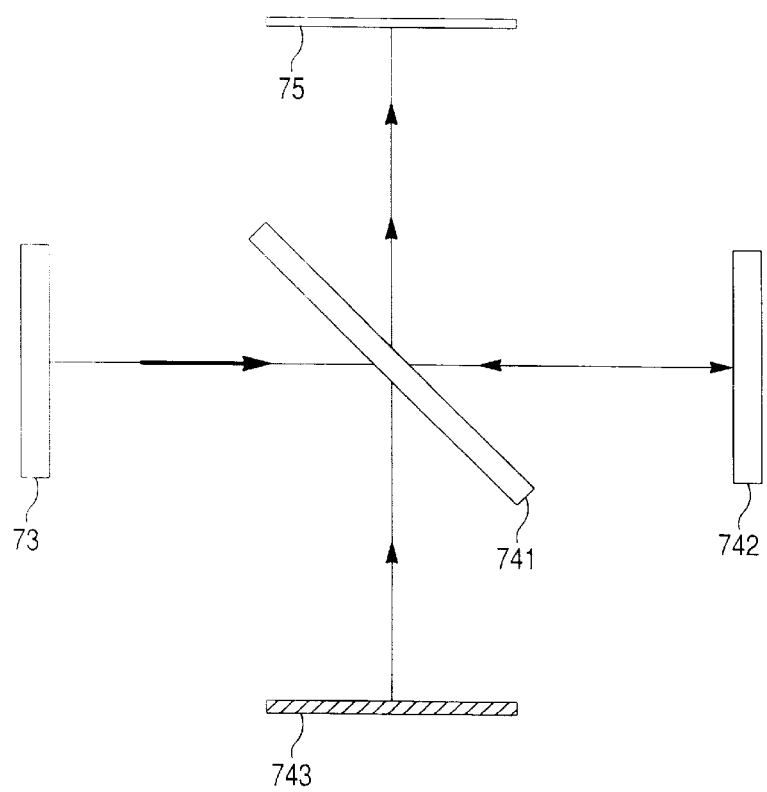
FIG. 12 is block diagram illustrating structure of optical processing unit 74.

FIG. 12 is a block diagram showing structure of optical processing unit 74. In FIG. 12, reconstructed light corresponding to the reconstructed image 73 goes through a beam splitter 741 and reflected at a mirror 742. The direction of the reflected light is changed by 90 degree by being reflected at the beam splitter 741. On the other hand, light corresponding to a interference pattern goes through the beam splitter 741. As a result, the reflected reconstructed image light and light of the interference pattern interfere with each other, and a new pattern image is generated. The new pattern image is the barcode pattern 75, and subjected to the optical sensor 76 as a readable pattern.

As explained above, the barcode pattern 75 reconstructed in the optical processing unit 74 is detected by the optical sensor 76. The optical sensor 76 outputs signals corresponding to optical intensity distribution of the barcode pattern 75 to a signal processing unit 79. The signal processing unit 79 converts signals input from the optical sensor 76 into series of rectangular pulses indicative of binary data. The binarization is performed based on the distribution of light strength. For example, threshold level for binarization may be determined based on highest level (white part of the barcode pattern) and lowest level (black part of the barcode pattern) of the signal from the optical sensor (for example, mean value of the highest and the lowest level). Thus, barcode pattern is recognized more reliably.

As described above, if ingeniously designed random pattern is used for hologram image, only meaningless pattern is reconstructed at the Fourier Transform plane. In this case, another pattern must be provided for converting such random pattern into a meaningful pattern which is detected by the optical sensor 76. The optical processing unit 74 performs such conversion. The optical sensor 76 detects the distribution of the light intensity of the meaningful pattern, and then the signal processing unit 79 generates binary data on the basis of the results of the detection of the optical sensor. For example, if a moire pattern is used at hologram recording, a designed barcode pattern can be obtained by interfering another moiré pattern to the pattern obtained from the hologram image.

When the optical sensor 76 scans the reconstructed barcode pattern 75, the scanning may be performed by moving the optical sensor 76 or moving the pattern (moving the card).

There is possibility that differential degrees of light strength between white and black portions of the pattern may be different from its original because of damage or deformation of the card. However, the optical sensor 76 and the optical processing unit 79 can read the pattern correctly since they generate binary data in accordance with relative light strength of the pattern.

Figure 13:
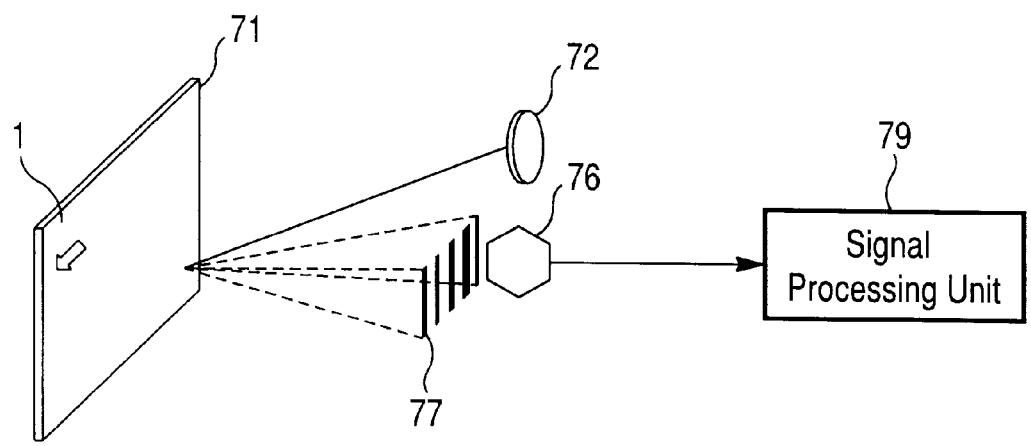
FIG. 13 illustrates a structure of hologram reader taken the optical processing unit.

It is noted that the optical processing unit 74 is necessary for hologram code recorded in a random pattern, a moire pattern or a reverse Fourier transform pattern. The optical processing unit 74 is not necessary when the reconstructed image 73 is a barcode pattern which provides intelligence. FIG. 13 shows structures of a hologram reader in which an optical processing unit is omitted. A barcode image 77 is reconstructed in a space by irradiating light from a light source 72 to a hologram image (hologram code). Then, an optical sensor 76 can directly read and recognize the barcode image 77. In case of Fourier Transform Hologram, Fourier Transform Lens exists between the reconstructed image 77 and the hologram 71.

The optical processing 74 may be realized in a digital manner. In such case, the function of the optical processing unit 74 is incorporated in the signal processor 79. In the structures shown in FIG. 11, the optical sensor 76 directly detects the light strength distribution of the reconstructed image 73. The detected signal is transferred to the signal processing unit 79. The signal processing unit 79 digitally processes the data. The operation of this processing (numerical operation) is equivalent to operation of interfering pattern 743 of FIG. 12. As a result of the processing, a distribution of light strength corresponding to the barcode pattern 75 can be obtained.

The optical processing unit 74 may utilize interference of optical wave surface. For example, when sphere surface wave interferes with plain surface wave, round stripe patterns are made. Also, if plane surface pattern interferes with another plane surface wave, barcode like patterns are made. If the reader is constructed so that spherical surface wave is obtained from the hologram image as reconstructed light and flat surface wave is supplied in the optical processing unit 74 as a interference pattern, readable barcode pattern 75 is obtained from a round stripe pattern. Thus, information can be obtained based on phase distribution of light reflected from the hologram.

As explained above, according to the above embodiment, card security is remarkably enhanced because a special hologram and a detection manner, as well as a special data check system, are utilized. Further, since the recognition of reconstructed image is performed by checking relative strength of light, correct recognition is achieved even if the card is damaged.

Further, since another predetermined interference pattern is required to obtain an image which makes sense, security is enhanced.

It is noted that self-clocking method known to the skilled person in the art is utilized in the signal processing unit for converting barcode image into binary data (rectangular pulse). The reconstruction of the image in a space requires an appropriate optical system (irradiation degree of light to a hologram image, wave length of irradiating light, reverse Fourier transform lens corresponding to a Fourier transform lens used at hologram recording). The hologram image is invisible under normal light. This also enhances security.

As explained above, according to the present invention, card security is effectively and remarkably enhanced.

I claim:

1. A method of enhancing security in a card security system having a card issuer and a card reader, comprising:
    a first recording step of recording at least first data onto an optically readable portion that is viewable on a first plane and contains a discrete visible holographic pattern formed to be reconstructed in a 2nd plane of a card;
    an input step of inputting at least second data into the card issuer;
    an obtaining step of obtaining check data based on at least the first and second data;
    a second recording step of recording at least the check data to a storage medium which can be accessed by at least the card reader; and
    a checking step of checking genuineness of the card by the card reader, based on at least data obtained by reading the optically readable portion of the card, data obtained from said storage medium, and the second data used in said input step.

2. A method according to claim 1, wherein said storage medium is at least one of an optically readable portion of the card, a magnetically readable portion of the card, a memory mounted on the card or a memory unit independent from the card.

3. A method according to claim 1, wherein said second recording step records the check data and the second data to the storage medium, and said checking step obtains data from the storage medium as the check data and the second data.

4. A method according to claim 3, wherein said storage medium includes a magnetically readable portion of the card and memory unit independent from the card, and said second recording step records the check data to the magnetically readable portion and records the second data to the memory unit.

5. A method according to claim 1, wherein said first recording step records the first data as a holographic image.

6. A method according to claim 1, wherein the obtaining step obtains the check data by encrypting at least the first data and the second data.

7. A card security system having a card issuer and a card reader, comprising:
    reading means for reading an optically readable portion that is viewable on a first plane and contains a discrete visible holographic pattern formed to be reconstructed in a 2nd plane of a card to obtain first data;
    input means for inputting second data into the card issuer;
    obtaining means for obtaining check data based on at least the first and second data in the card issuer;
    recording means for recording at least the check data onto a storage medium which can be accessed by at least the card reader; and
    checking means for checking genuineness of the card by the card reader, based on at least data obtained by reading the optically readable portion of the card, data obtained from said storage medium, and the second data used in said input means.

8. A card reading apparatus for reading a card having optically readable portion, comprising:
    optical reader means for reading at least first data from the optically readable portion that is viewable on a first plane and contains a discrete visible holographic pattern formed to be reconstructed in a 2nd plane;
    first obtaining means for obtaining at least second data and third data from a storage medium;
    second obtaining means for obtaining check data based on at least the first and second data; and
    judging means for judging genuineness of the card by comparing the check data with the third data.

9. A card reader apparatus according to claim 8, wherein said storage medium is at least one of an optically readable portion of the card, a magnetically readable portion of the card, a memory mounted on the card or a memory unit independent from the card.

10. A card reader apparatus according to claim 9, wherein said first obtaining means obtains the second data from the memory unit and obtains the third data from the magnetically readable portion.

11. A card reader apparatus according to claim 8, wherein said recording medium includes a magnetically readable portion on the card, further comprising invalidating means for invalidating data recorded on the magnetically readable portion after the card is used.

12. A card issuing apparatus for issuing a card, comprising:

reading means for reading at least first data from an optically readable portion that is viewable on a first plane and contains a discrete visible holographic pattern formed to be reconstructed in a 2nd plane of the card;

input means for inputting at least second data;

determining means for determining check data based on at least the first and the second data; and recording means for recording at least the check data to storage medium.

13. A card issuing apparatus according to claim 12, wherein said storage medium is at least one of an optically readable portion of the card, a magnetically readable portion of the card, a memory mounted on the card or a memory unit independent from the card.

14. A card issuing apparatus according to claim 13, wherein said recording means records the check data to the magnetically readable portion and records the second data to the memory unit.

* * * * *